(12) United States Patent
Maercovich et al.

(10) Patent No.: US 7,862,001 B2
(45) Date of Patent: *Jan. 4, 2011

(54) AUTOMATIC FLUSH ACTUATION APPARATUS

(76) Inventors: Jorge Maercovich, 6409 Independence Ave., Woodland Hills, CA (US) 91367; Leo Maercovich, 6409 Independence Ave., Woodland Hills, CA (US) 91367

(\*) Notice: Subject to any disclaimer, the term of this patent is extended or adjusted under 35 U.S.C. 154(b) by 0 days.

This patent is subject to a terminal disclaimer.

(21) Appl. No.: 12/454,775

(22) Filed: May 21, 2009

(65) Prior Publication Data

US 2009/0235989 A1 Sep. 24, 2009

Related U.S. Application Data

(60) Continuation of application No. 12/215,553, filed on Jun. 27, 2008, now Pat. No. 7,552,905, which is a continuation of application No. 11/801,928, filed on May 11, 2007, now Pat. No. 7,407,147, which is a division of application No. 11/192,627, filed on Jul. 29, 2005, now Pat. No. 7,232,110, which is a division of application No. 11/004,704, filed on Dec. 3, 2004, now Pat. No. 7,028,977, which is a division of application No. 10/640,693, filed on Aug. 14, 2003, now Pat. No. 6,845,961, which is a continuation-in-part of application No. 10/377,124, filed on Feb. 28, 2003, now Pat. No. 6,840,496.

(51) Int. Cl.
*F16K 31/12* (2006.01)

(52) U.S. Cl. .............. 251/40; 251/129.03; 251/129.04; 4/304

(58) Field of Classification Search .............. 251/36, 251/40, 129.03, 129.04, 26; 4/304, 623
See application file for complete search history.

(56) References Cited

U.S. PATENT DOCUMENTS

| | | | | |
|---|---|---|---|---|
| 2,388,990 | A * | 11/1945 | Nelson et al. | 335/257 |
| 5,125,621 | A * | 6/1992 | Parsons et al. | 251/30.03 |
| 5,244,179 | A * | 9/1993 | Wilson | 251/30.03 |
| 6,056,261 | A * | 5/2000 | Aparicio et al. | 251/129.03 |
| 6,840,496 | B2 * | 1/2005 | Maercovich et al. | 251/129.03 |
| 6,974,118 | B2 * | 12/2005 | Maercovich et al. | 251/129.03 |
| 7,552,905 | B2 * | 6/2009 | Maercovich et al. | 251/40 |

\* cited by examiner

*Primary Examiner*—John K Fristoe, Jr.
(74) *Attorney, Agent, or Firm*—Raymond Y. Chan; David and Raymond Patent Firm

(57) ABSTRACT

An automatic flush actuation apparatus, which is incorporated with a flushing system having a water inlet, a water outlet, and a water chamber communicating therebetween, that includes a valve member being moved by a flush lever for releasing the water pressure within the water chamber to allow the water passing from the water inlet to the water outlet, and a sensor-operated powering assembly including a relief valve provided at the valve member for controlling the water flowing to the water outlet and an actuator arranged in such a manner that while sensing a presence of a user of the flushing system, the actuator is driven to move the relief valve to an opened position for releasing the water pressure within the water chamber to allow the water passing to said water outlet.

19 Claims, 10 Drawing Sheets

AUTOMATIC FLUSH ACTUATION APPARATUS

CROSS REFERENCE OF RELATED APPLICATION

This is a Continuation application that claims the benefit of priority under 35U.S.C. §119 to a non-provisional application having an application Ser. No. 12/215,553 and a filing date of Jun. 27, 2008 now U.S. Pat. No. 7,552,905, which is a Continuation application that claims the benefit of priority under 35U.S.C. §119 to a non-provisional application having an application Ser. No. 11/801,928 and a filing date of May 11, 2007 now U.S. Pat. No. 7,407,147, which is a divisional application that claims the benefit of priority under 35U.S.C. §119 to a non-provisional application, having an application Ser. No. 11/192,627 and a filing date of Jul. 29, 2005 now U.S. Pat. No. 7,232,110, which is a divisional application that claims the benefit of priority under 35U.S.C. §119 to a non-provisional application having an application Ser. No. 11/004,704 and a filing date of Dec. 3, 2004 now U.S. Pat. No. 7,028,977, which is a divisional application that claims the benefit of priority under 35U.S.C. §119 to a non-provisional application having an application Ser. No. 10/640,693 and a filing date Aug. 14, 2003 now U.S. Pat. No. 6,845,961, which is a Continuation-In-Part application that claims the benefit of priority under 35U.S.C. §119 to a non-provisional application having an application Ser. No. 10/377,124 and a filing date of Feb. 28, 2003 now U.S. Pat. No. 6,840,496.

BACKGROUND OF THE PRESENT INVENTION

1. Field of Invention

The present invention relates to an automatic flush actuation apparatus which is capable of incorporating with a conventional manual system, such as urinal and water closet, so as to selectively operate the automatic flush actuation apparatus automatically through the use of a sensor or normally through an actuation lever.

2. Description of Related Arts

Manual operated toilet room flush valves for use on urinals and water closets in public restrooms are well known. As shown in FIG. 1, a conventional manual operated automatic flush actuation apparatus comprises a valve body A1 having a water inlet A11 and a water outlet A12, a diaphragm A2 having a water channel A21 communicating between the water inlet A11 and the water outlet A12, a relief valve A3 disposed at the diaphragm A2 for blocking the water flowing from the water inlet A11 to the water outlet A12 through the water channel A21, and a flush lever A4 arranged to move the relief valve A3 at a position that the water is allowed to flow to the water outlet A12 for completing the flushing operation.

For hygiene purposes, an automatic operated toilet room flush valve is developed. For example, U.S. Pat. Nos. 5,169,118 and 5,244,179 disclose a solenoid operated automatic flush valve which is battery-operated and utilizes a latching solenoid to limit power drain on the battery. Accordingly, when the infrared sensor detects the presence of a user of a urinal or toilet, the flush valve is automatically driven to open to complete the flushing operation. However, the flush valves, according to the above patents, have several common drawbacks.

The presence of the user sensed by the infrared sensor will cause the solenoid to move the diaphragm to a valve open position. It is known that the solenoid is made of a number of circular wire loops to generate a magnetic force when an electric current is passed through the wire loops. The solenoid may come in contact with water such that the solenoid may accumulate rusting particles from the water, which may remain on the solenoid. It is one of the common problems to cause a failure of operation of the flush valve. In other words, the conventional manual operated flush valve is more reliable than the solenoid operated automatic flush valve. Thus, the maintenance cost of the solenoid operated automatic flush valve is higher than that of the conventional manual operated flush valve.

In addition, the structural design of the solenoid operated automatic flush valve is different from that of the manual operated flush valve. In other words, when the flushing system is incorporated with the solenoid operated automatic flush valve, the flushing system will lose the mechanical-manual operated feature. Therefore, there is no alternative to operate the flushing cycle when the solenoid operated automatic flush valve has failed to operate.

In order to install the solenoid operated automatic flush valve into the conventional flushing system, the mechanical-manual operating mechanism of the flush valve must be totally removed, which is a waste of resources in order to incorporated with the solenoid operated automatic flush valve.

The configuration of the solenoid operated automatic flush valve is complicated, wherein once the solenoid is broken or the battery is dead, the facility should call a technician to open an outer cover and disassemble an inner cover for the replacement of the solenoid or the battery. Due to the complicated structure of the solenoid operated automatic flush valve, the solenoid operated automatic flush valve requires a skilled technician to replace the broken solenoid and/or even replace the battery, which may further increase the maintenance cost of the infrared operated automatic flush valve.

SUMMARY OF THE PRESENT INVENTION

A main object of the present invention is to provide an automatic flush actuation apparatus which is capable of incorporating with a conventional manual flushing system, such as urinal and water closet, so as to automatically operate the flush valve through the use of a sensor.

Another object of the present invention is to provide an automatic flush actuation apparatus without altering the original structural design of the manual operated flush valve in order to incorporate with the present invention. Therefore, the user is able to mechanically-manually operate the flushing cycle for the flushing system if the automatic operation system is not functioning properly.

Another object of the present invention is to provide an automatic flush actuation apparatus which is reliable and that can be easily installed and maintained.

Another object of the present invention is to provide an automatic flush actuation apparatus, wherein a covering cap has a battery opening that allows a power source exposing to outside. Therefore, any individual is able to simply replace the power source without detaching the covering cap from the flushing system, so as to reduce the maintenance cost of the present invention.

Another object of the present invention is to provide an automatic flush actuation apparatus, wherein the covering cap further has a sensor opening that allows a CPU exposing to outside. Therefore, any individual is able to make adjustments via the sensor switch through the CPU opening without detaching the covering cap from the flushing system.

Another object of the present invention is to provide an automatic flush actuation apparatus, which is powered by an electric motor so as to avoid water damage and to enhance performance and reliability.

Another object of the present invention is to provide an automatic flush actuation apparatus, which provides an economic and efficient solution for incorporating with the conventional manual operated flushing system in a simple and economical way.

Accordingly, in order to accomplish the above objects, the present invention provides an automatic flush actuation apparatus for a flushing system which comprises a valve body having a water inlet, a water outlet and a water chamber communicating therebetween, a valve seat, having a flush channel, normally sealed with the water chamber and disposed between the water inlet and the water outlet for retaining a predetermined water pressure within the water chamber so as to block water flowing from the water inlet to the water outlet, and a flush lever coupled with the valve body, wherein the flush valve comprises:

a valve member adapted for being disposed at the valve seat to control the water flowing from the water inlet to the water outlet, wherein the valve member is capable of being moved by the flush lever between a manual-operated closed position and a manual-operated opened position, wherein at the manual-operated closed position, the valve member is arranged for sealedly sitting at the valve seat to block the water from passing through the water outlet, and at the manual-operated opened position, the valve member is moved to an opened position for releasing the water pressure within the water chamber to allow the water to pass from the water inlet to the water outlet through the water chamber; and a sensor-operated powering assembly, comprising:

a housing, which is adapted for mounting on the valve body; a replaceable power source received in the housing; a CPU electrically connected with the power source for sensing a presence of a user of the flushing system, so as to active the power generator; a power generator electrically connected to the CPU; a relief valve provided at the valve member for controlling the water flowing from the water inlet to the water outlet through the water chamber; and an actuator driven by the power generator to move the relief valve between an auto-operated closed position and an auto-operated opened position, wherein at the auto-operated closed position, the relief valve is sealedly closed for blocking the water passing to the water outlet, and at the auto-operated opened position, the relief valve is moved to an opened position by the actuator for releasing the water pressure within the water chamber to allow the water passing to the water outlet.

These and other objectives, features, and advantages of the present invention will become apparent from the following detailed description, the accompanying drawings, and the appended claims.

DETAILED DESCRIPTION OF THE PREFERRED EMBODIMENT

Figure 1:
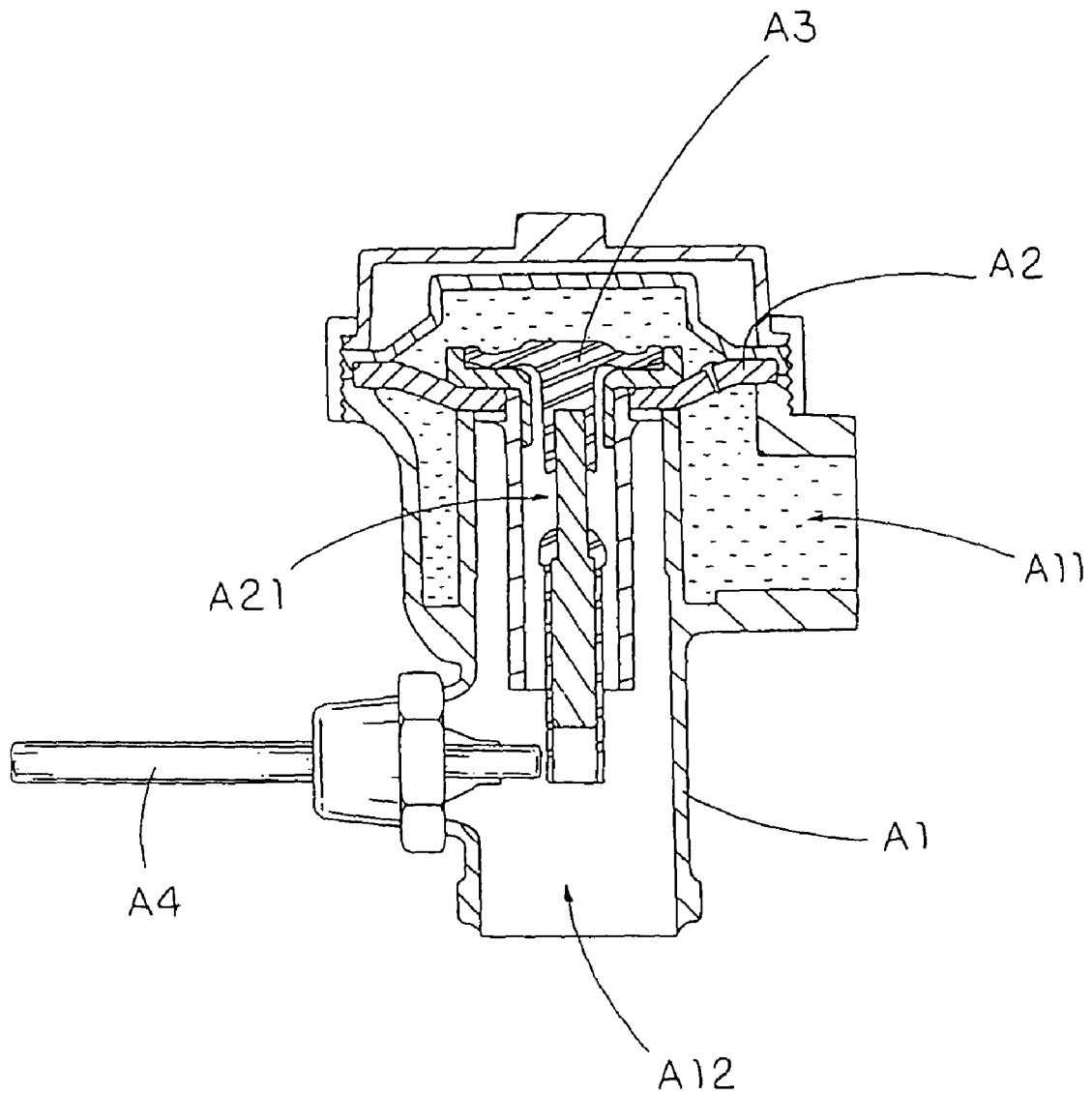
FIG. 1 is a sectional view of a conventional manual operated flushing system.
Figure 2:
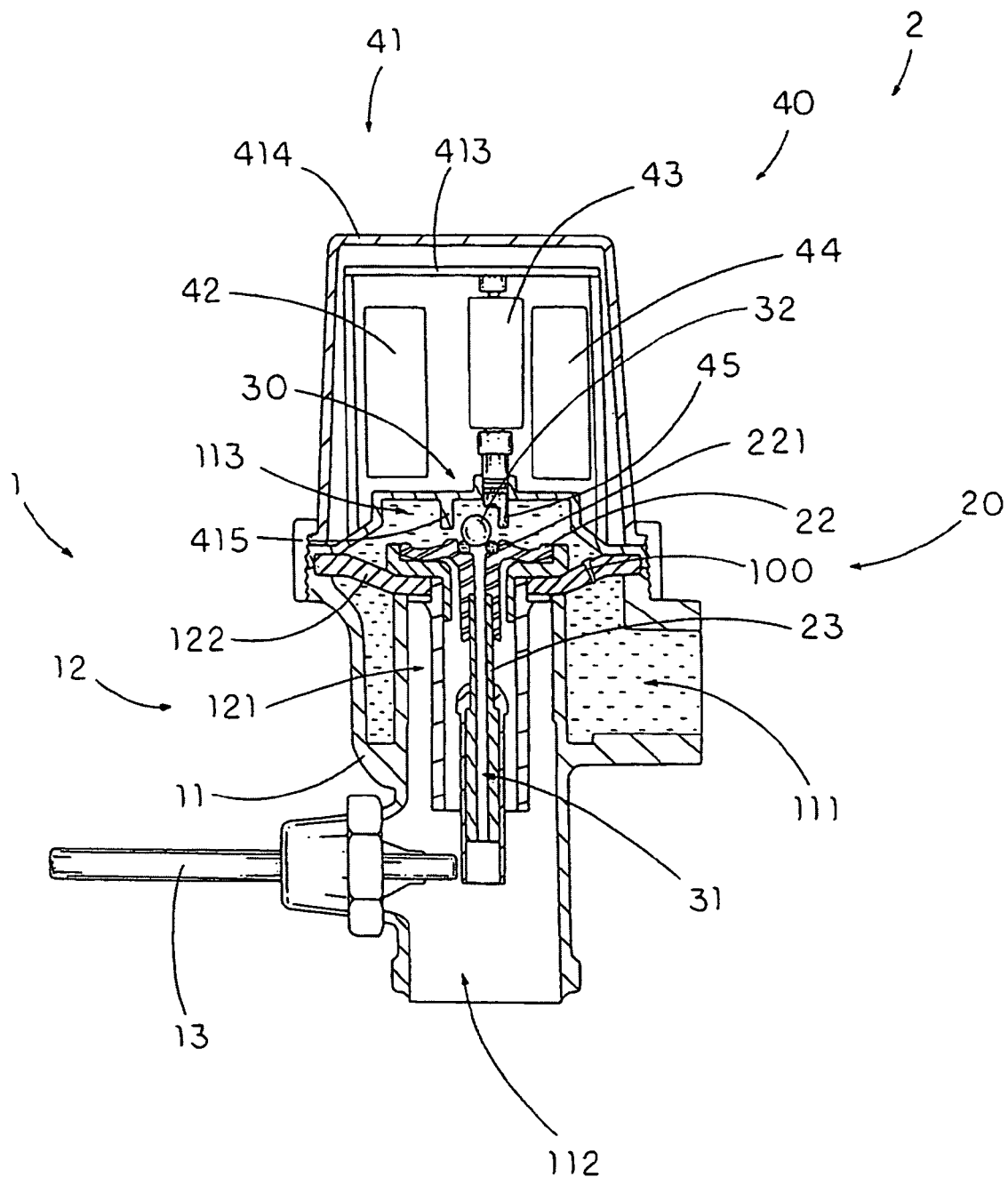
FIG. 2 is a sectional view of an automatic flush actuation apparatus according to a preferred embodiment of the present invention.

Referring to FIG. 2 of the drawings, an automatic flush actuation apparatus 2 for a flushing system 1 according to a preferred embodiment of the present invention is illustrated, wherein the automatic flush actuation apparatus 2 is capable of incorporating with a conventional manual operated fluid flow system such as a flushing system to achieve both manual and automatic operations to start a flushing cycle of the flushing system 1.

The flushing system 1, such as the conventional manual operated flushing system, comprises a valve body 11 having a water inlet 111, a water outlet 112 and a water chamber 113 that is normally sealed between the water inlet 111 and the water outlet 112, a valve seat 12, having a flush channel 121, disposed between the water inlet 111 and the water outlet 112 to block water flowing from the water inlet 111 to the water outlet 112, and a flush lever 13 coupled with the valve body 11.

The valve seat 12 comprises a diaphragm 122, having a bleed hole 100, sealedly disposed in the valve body 11 in a movable manner to define the water chamber 113 above the diaphragm 122 to communicate between the water inlet 111 and the water outlet 112. In other words, once the water within the water chamber 113 is released to reduce the water pressure therein, the diaphragm 122 is forced to bend upwardly so that the water is capable of passing from the water inlet 111 to the water outlet 112 to complete the flushing cycle of the flushing system.

Accordingly, the water is flowed into the water chamber 113 from the water inlet 111 through the bleed hole 100 on the diaphragm 122 in such a manner that the water within the water chamber 113 provides a predetermined water pressure against the diaphragm 122 to normally block the water flowing to the water outlet 112.

The automatic flush actuation apparatus 2 comprises a valve member 20 and a sensor-operated powering assembly 40.

The valve member 20 is adapted for being disposed at the valve seat 12 to control the water flowing from the water inlet 111 to the water outlet 112. The valve member 20 is capable of being moved by the flush lever 13 between a manual-operated closed position and a manual-operated opened position, wherein at the manual-operated closed position, the valve member 20 is arranged for sealedly sitting at the valve seat 12 to block the water passing to the water outlet 112, and at the manual-operated opened position, the valve member 20 is moved to an opened position for releasing the water pressure within the water chamber 113 through the flush channel 121 so as to allow the water passing from the water inlet 111 to the water outlet 112.

Figure 5:
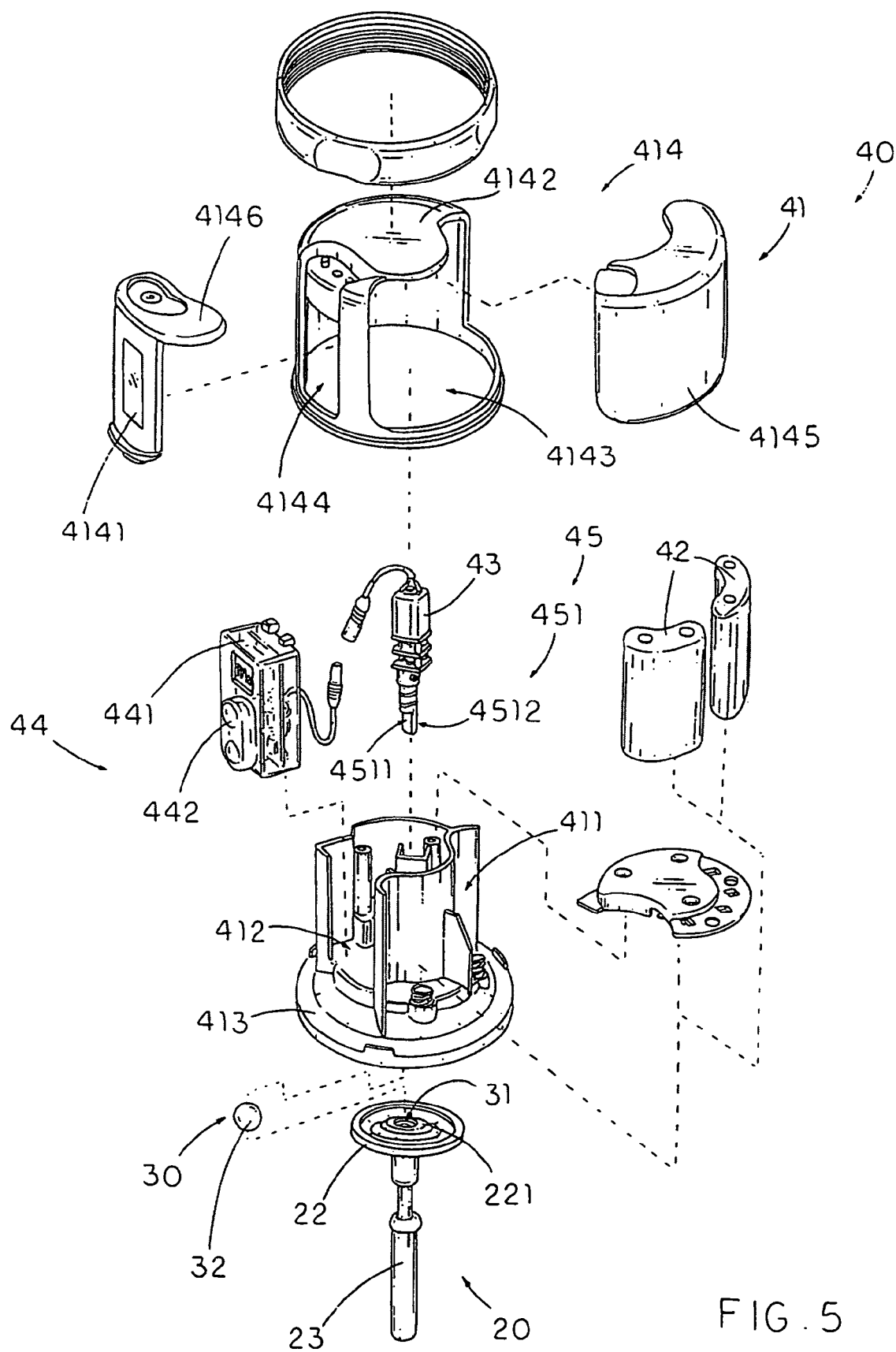
FIG. 5 is an exploded perspective view of a sensor-operated powering device of the automatic flush actuation apparatus according to the above preferred embodiment of the present invention.

As shown in FIGS. 2 and 5, the sensor-operated powering assembly 40 comprises a housing 41, which is adapted for mounting on the valve body 11, having a power source compartment 411 and a CPU cavity 412, a power source 42 replaceably received in the power source compartment 411, a power generator 43 electrically connected to the CPU 44, and the CPU 44 which is received in the CPU cavity 412 of the housing 41, electrically connected with the power source 42 for sensing a presence of a user of the flushing system 1, so as to active the power generator 43.

The sensor-operated powering assembly 40 further comprises a relief valve 30 provided at the valve member 20 for controlling the water flowing from the water inlet 111 to the water outlet 112 through the water chamber 113 and an actuator 45 driven by the power generator 43 to move the relief valve 30 between an auto-operated closed position and an auto-operated opened position.

Accordingly, at the auto-operated closed position, the relief valve 30 is sealedly closed for blocking the water passing to the water outlet 112, and at the auto-operated opened position, the relief valve 30 is moved to an opened position by the actuator 45 for releasing the water pressure within the water chamber 113 to allow the water passing to the water outlet 112.

According to the preferred embodiment, the valve member 20 comprises a sealing platform 22 arranged for sealedly supporting on the diaphragm 122 of the valve seat 12 to normally close the flush channel 121 and a valve controlling shaft 23 downwardly extended from the sealing platform 22 for communicating with the flush lever 13 within the flush channel 121.

Figure 3A:
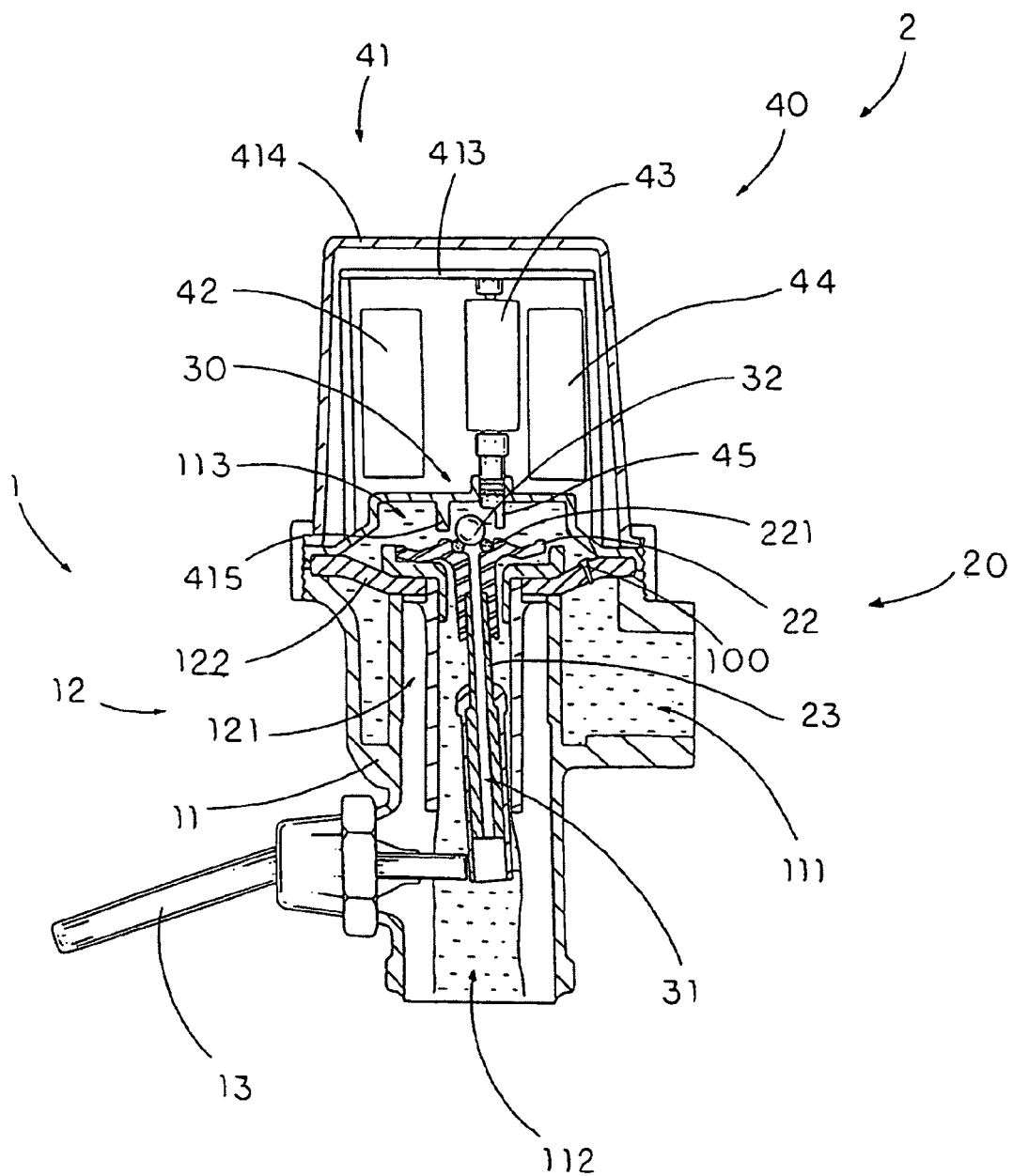
FIGS. 3A and 3B illustrate a manual operation of the flushing cycle for the automatic flush actuation apparatus according to the above preferred embodiment of the present invention.
Figure 3B:
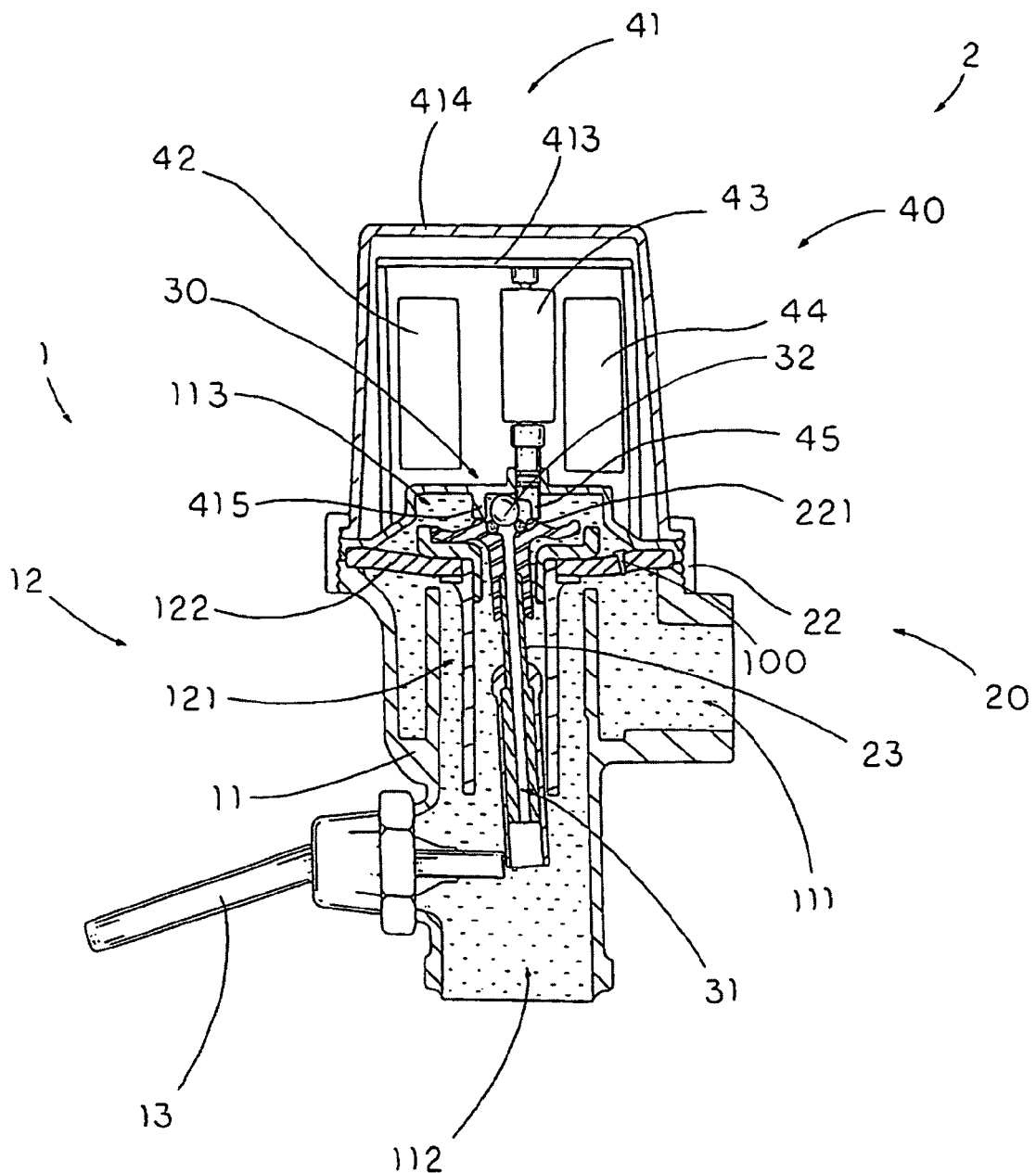

As shown in FIG. 3A, by actuating the flush lever 13, the valve controlling shaft 23 is pushed to drive the sealing platform 22 at a position offset with respect to the diaphragm 122 such that the water within the water chamber 113 is allowed to flow out through the flush channel 121 and release the water pressure within the water chamber 113 because the amount of water flowing out through the flush channel 121 is much larger than the amount of water flowing in through the bleed hole 100. Thus, when the water pressure within the water chamber 113 reduces, the diaphragm 122 is pushed upwardly for allowing the water passing to the water outlet 112, so as to start the flushing cycle of the flushing system 1 manually as the conventional manual-operated flushing system, as shown in FIG. 3B.

Once the flush lever 13 is returned back to its original position, the sealing platform 22 is forced to sealedly sit on the diaphragm 122 due to the water pressure so as to sealedly close the flush channel 121. Therefore, the diaphragm 122 is dropped down by refilling the water back into the water chamber 113 to increase the water pressure therein so as to sealedly close the water outlet 112 to stop the water passing thereto. It is worth to mention that since the sealing platform 22 is normally sealed on the diaphragm 122, no water is allowed to flow through the flush channel 121 to the water outlet 112 until the flushing cycle is started.

The relief valve 30 has a water passage 31 axially extended along the valve member 20 for communicating the water chamber 113 with the water outlet 112, and a valve stopper 32 disposed on the valve member 20 to normally close the water passage 31 for controlling the water flowing from the water inlet 111 to the water outlet 112.

As shown in FIG. 2, the water passage 31 is coaxially extended from the sealing platform 22 to a bottom end of the valve controlling shaft 23 for communicating the water chamber 113 with the water outlet 112.

The valve stopper 32, having a ball-shape, sits on the sealing platform 22 at an opening of the water passage 31 to normally close the water passage 31 for blocking the water pressure releasing from the water chamber 113. Accordingly, the sealing platform 22 has a circular retaining seat 221 protruding upwardly around the opening of the water passage 31 wherein the valve stopper 32 is disposed at the retaining seat 221 of the valve member 20 so as to hold the valve stopper 32 in position. It is worth to mention that when the valve member 20 is moved between the manual-operated closed position and the manual-operated opened position, the valve stopper 32 remains at the opening of the water passage 31 to block the water passing the water outlet 112.

As shown in FIG. 5, the housing 41 comprises a supporting frame 413 supported above the valve stopper 32 and a valve cap 414, having a transparent window 4141, adapted for detachably mounting on the valve body 11 to protectively enclose the supporting frame 413, wherein the power source 42, the power generator 43, and the CPU 44 are supported by the supporting frame 413 and enclosed by the valve cap 414 while the CPU 44 is capable of communicating with outside through the transparent window 4141.

According to the preferred embodiment, the power source 42 comprises a battery replaceably disposed in the power source compartment 411 to electrically connect with the CPU 44. It is worth to mention that the power source 42 can be used as an AC current to electrically plug into an electric outlet for supplying electricity to the CPU 44.

The power generator 43, according to the preferred embodiment, is an electric motor electrically connected to the CPU 44 wherein the power generator 43 is actuated via the CPU 44 to drive the actuator 45 to rotate. Accordingly, the power generator 43 can be a conventional solenoid electrically connected to the CPU 44 to drive the actuator 45 so as to move the valve stopper 32 between the auto-operated closed position and the auto-operated opened position. It is worth to mention that the electric motor is more reliable than the solenoid because the electric motor provides simple mechanical work rather than using the magnetic force, so as to minimize the failure operation of the power generator 43 and to reduce the maintenance cost of the present invention.

The CPU 44 comprises a control processor 441 supported in the housing 41 and a sensor 442 which is electrically connected to the control processor 441 and aligned with the transparent window 4141 of the valve cap 414. Accordingly, the sensor 442 is an infrared sensor arranged to detect the presence of the user by means of infrared signal in such a manner that when the sensor 442 sends an infrared signal through the transparent window 4141 for detecting the presence of the user of the flushing system, the control processor 441 activates the power generator 43 to actuate valve stopper 32 to open the relief valve 30.

In addition, the control processor 441 is a control circuitry to control the configuration of the flushing cycle wherein the control processor 441 is adapted to control the time of the flushing cycle, the water volume for each flushing cycle, the detecting range of the sensor 442, and the motion of the electric motor of the power generator 43. Thus, a default configuration is preset in the control processor 441 such that the automatic flush actuation apparatus of the present invention is capable of returning to its original settings through the control processor 441. It is worth to mention that the control processor 441 also controls the power of the power source 42 wherein when there is no sufficient power to actuate the power generator 43, the control processor 441 will control the relief valve 30 to remain in the closed position. In other words, only the manual operation of the flush lever 13 is capable of starting the flushing cycle when the control processor 441 stops the actuation of the relief valve 30.

The actuator 45 is rotatably extended from the power generator 43 wherein the actuator 45 has a driving end portion 451 downwardly and rotatably extended from a bottom side of the supporting frame 413 to contact with the valve stopper 32. Accordingly, the driving end portion 451 of the actuator 45, having a semi-circular cross section, has a flat contacting surface 4511 and a curved contacting surface 4512, wherein the driving end portion 451 of the actuator 45 is arranged to be driven to rotate via the power generator 43 to move the valve stopper 32 at the auto-operated closed position that the valve stopper 32 is contacted with the flat contacting surface 4511 of the actuator 45 to retain the valve stopper 32 at the opening of the water passage 31 for blocking the water passing to the water outlet 112 as shown in FIG. 2, and to move the valve stopper 32 at the auto-operated opened position that the valve stopper 32 is contacted with the curved contacting surface 4512 of the actuator 45 to move the valve stopper 32 to offset the opening of the water passage 31 for allowing the water passing to the water outlet, as shown in FIG. 4A.

Figure 4A:
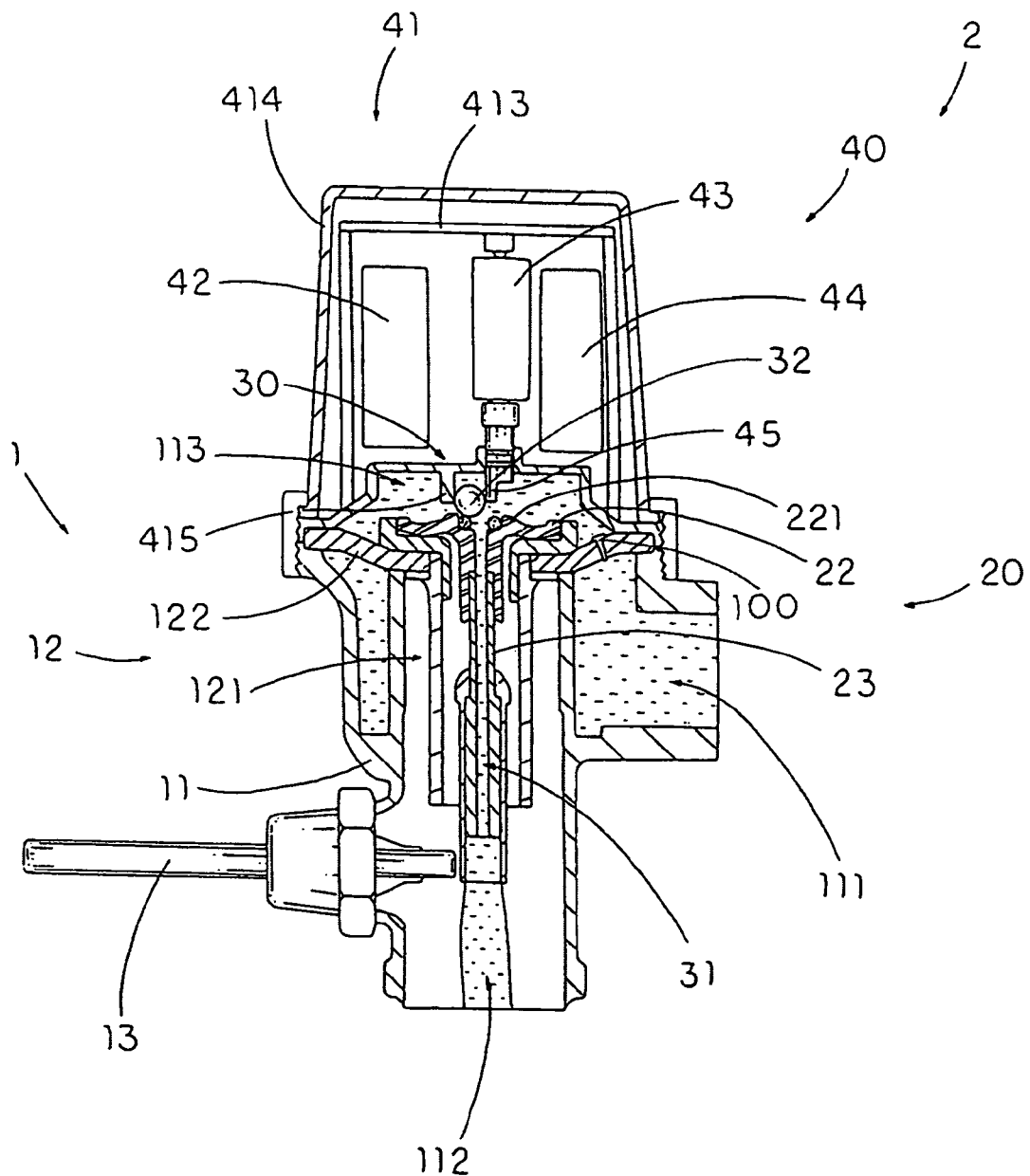
FIGS. 4A and 4B illustrate an automatic sensor operation of the flushing cycle for the automatic flush actuation apparatus according to the above preferred embodiment of the present invention.
Figure 4B:
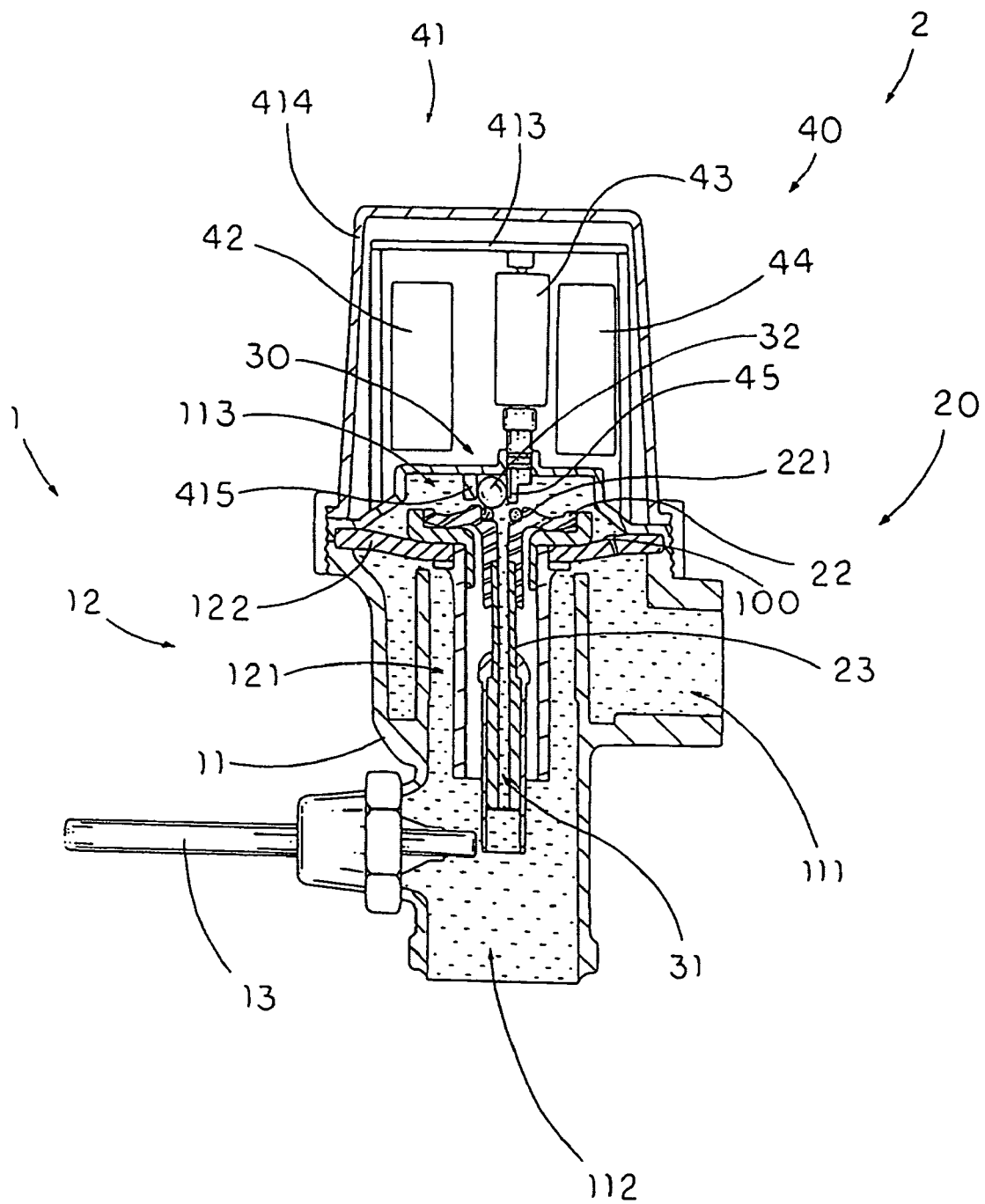

It is worth to mention that when the actuator 45 moves the valve stopper 32 away from the opening of the water passage 31, the water within the water chamber 113 is allowed to flow out through the water passage 31 so as to reduce the water pressure within the water chamber 113, as shown in FIG. 4A. Then, the diaphragm 122 is pushed upwardly for allowing the water flowing from the water inlet 111 to the water outlet 112, as shown in FIG. 4B. Once the valve stopper 32 is moved back into its original position to close the water passage 31, the diaphragm 122 is dropped down by refilling the water back into the water chamber 113 to increase the water pressure therein so as to sealedly close the water outlet 112 to stop the water passing thereto.

The sensor-operated flushing cycle of the flushing system 1 is controlled by the rotation of the actuator 45. Once the driving end portion 451 of the actuator 45 is rotated back to its original position, i.e. valve stopper 32 is contacted with the flat contacting surface 4511 of the actuator 45, the valve stopper 32 is forced to sealedly sit on the valve member 20 by means of water pressure to close the water passage 31. Therefore, the diaphragm 122 is dropped down by pressure to sealedly close the water outlet 112 to stop the water passing thereto.

It is worth to mention that the volume of water used in one flushing cycle for the flushing system 1 can be controlled by the power generator 43 through the CPU 44 to control the rotational speed of the actuator 45. The volume of water used in each flushing cycle can be adjustably controlled by controlling the rotational cycle of the actuator 45, i.e. how long the actuator 45 drives the valve stopper 32 to stay in the opened position and the closed position. In other words, the water volume of each flushing cycle will be increased when the CPU 44 delays the rotational cycling time of the actuator 45.

Accordingly, when the valve stopper 32 is moved between the auto-operated closed position and the auto-operated opened position, the valve member 20 is remained at its manual-operated closed position. Since the manual operation and the sensor operation employ with different water pathways, i.e. the flush channel 121 and the water passage 31, the manual and sensor operations do not interrupt with each other and function individually.

Therefore, to start the flushing cycle of the flushing system, the individual is able to either manually operate the flush lever 13 to move the valve member 20 to an offset position so as to release the water pressure through the flush channel 121 or automatically operate the CPU 44 to move the valve stopper 32 to an offset position so that the water pressure is allowed to be released through the water passage 31. In other words, even though the sensor-operated powering assembly 40 fails to operate due to the battery, the individual is still able to complete the flushing cycle for the flushing system manually.

In order to securely hold the valve stopper 32 in position, the supporting frame 413 of the housing 41 further comprises a locating ring 415 integrally and downwardly protruded from the bottom side of the supporting frame 413 to coaxially align with the water passage 31 so as to form as a boundary for the valve stopper 32 to move within the locating ring 415. In other words, the locating ring 415 limits the movement of the valve stopper 32 to prevent the valve stopper 32 from becoming dislocated on the valve member 20 and to guide the valve stopper 32 returning back to the opening of the water passage 31 after completing the flushing cycle.

As shown in FIG. 5, the valve cap 414 further comprises an outer casing 4142 having a power source opening 4143 aligned with the power source compartment 411 to expose the power source 42 to outside through the power source opening 4143 and a CPU opening 4144 aligned with the CPU cavity 412 to expose the CPU 44 to outside through the CPU opening 4144, and a power source cover 4145 detachably mounted on the outer casing 4142 to cover the power source opening 4143, wherein the transparent window 4141 is detachably mounted on the outer casing 4142 to enclose the CPU 44 within the valve cap 414.

Therefore, an individual is able to replace the power source 42 and to adjust the settings of the CPU 44 by detaching the power source cover 4145 and the transparent window 4141 respectively without removing the entire valve cap 414 so as to simplify the replacement operation and adjustment of the present invention. It is worth to mention the valve cap 414, such as the conventional cap, is securely mounted on the valve body 11 via a locking ring 400 such that the individual must use a wrench to unscrew the locking ring 400 in order to detach the valve cap 414. It is worth to mention that the locking ring 400 is arranged to sealedly mount the diaphragm 122 of the valve seat 12 on the valve body 11 to prevent water leakage thereof. However, it would be inconvenient to replace the power source 42 and to adjust the CPU 44 if the valve cap 414 must be detached from the valve body 11 and then sealedly attached back onto the valve body 11. Thus, the water may leak to the outside when the valve cap 414 is opened, especially if the valve cap 414 is not perfectly sealed onto the valve body 11.

In addition, the valve cap 414 further comprises a cover locker 4146 provided on the outer casing 4142 to securely lock up the power source cover 4145 and the transparent window 4141 to enclose the power source opening 4143 and the CPU opening 4144 respectively. It is worth to mention that the locking and unlocking operation of the cover locker 4146 is simply in comparison with the locking and unlocking operation of the valve cap 414, so as to provide a quick and easy replacement operation of the present invention.

In comparison with the conventional manual operated flushing system, the conventional manual operated flushing system can keep most of the major components, such as the valve body 11, valve seat 12 and the flush lever 13, in order to incorporate with the automatic flush actuation apparatus 2 of the present invention, so as to minimize the cost of incorporating the conventional manual operated flushing system with the automatic flush actuation apparatus 2 of the present invention.

Figure 6:
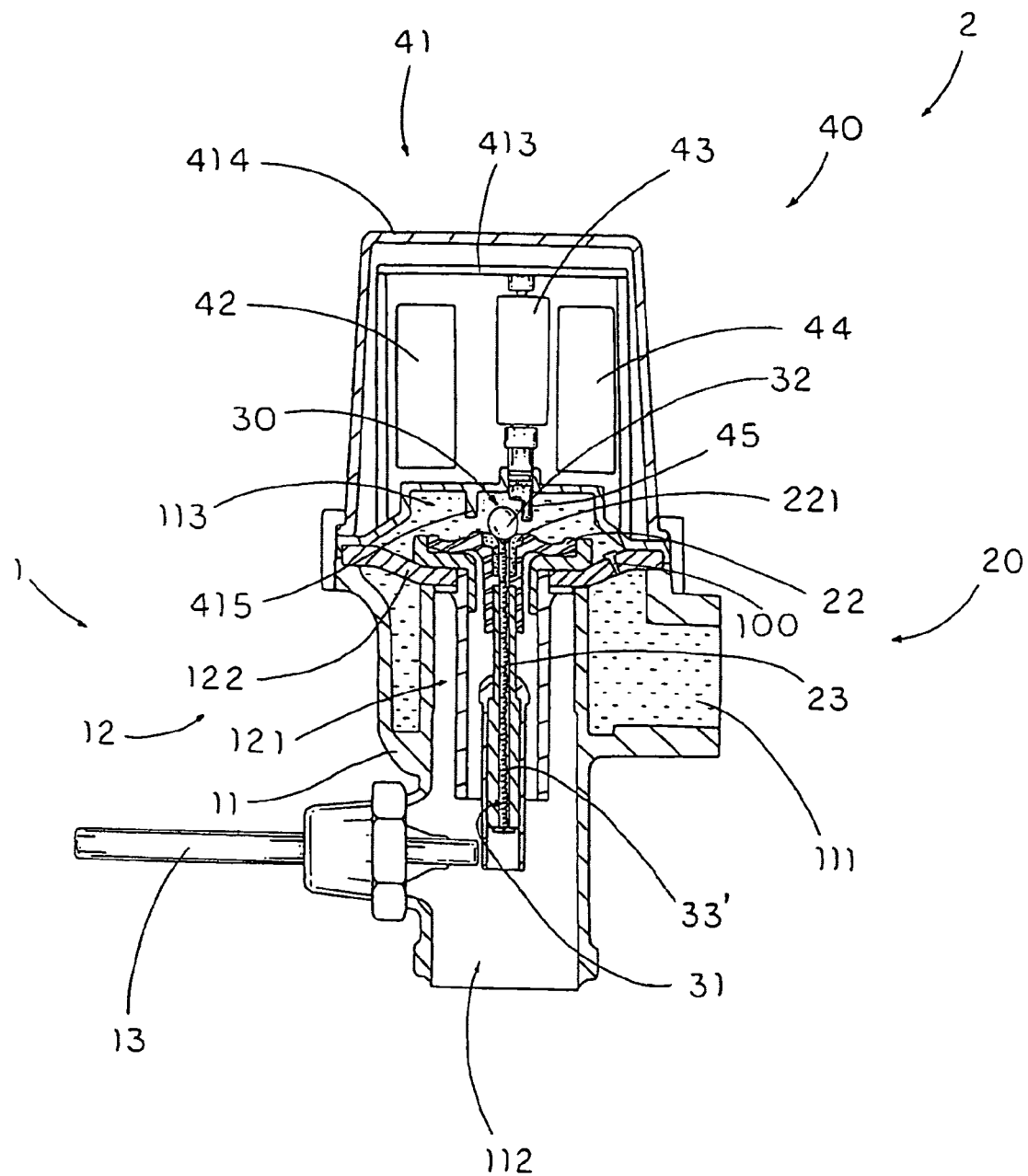
FIG. 6 illustrates an alternative mode of the relief valve of the automatic flush actuation apparatus according to the above preferred embodiment of the present invention.

FIG. 6 illustrates an alternative mode of the relief valve 30 wherein the relief valve 30 further comprises a resilient element 33' having a biasing end biasing against the valve stopper 32 so as to normally retain the valve stopper 32 at the auto-operated closed position. The resilient element 33', according to the preferred embodiment, is a compression spring disposed within the water passage 31 for applying an urging force against the valve stopper 32 so as to normally pull the valve stopper 32 to sealedly close the opening of the water passage 31. As shown in FIG. 6, the biasing end of the resilient element 33' coupled with the valve stopper 32 and an opposed affixing end coupled with a bottom end of the water passage 31 for applying the pulling force against the valve stopper 32.

Figure 7A:
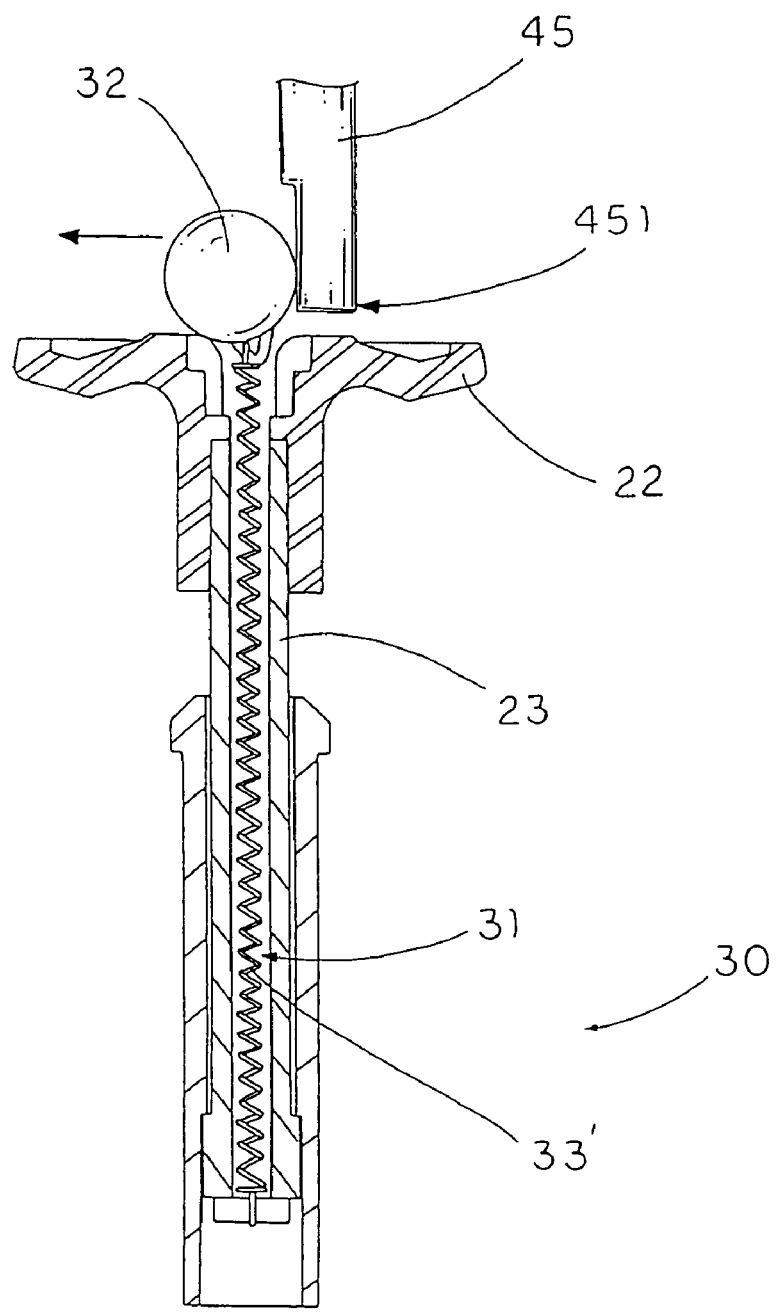
FIGS. 7A and 7B illustrate the operation of the relief valve of the alternative mode according to the above preferred embodiment of the present invention.
Figure 7B:
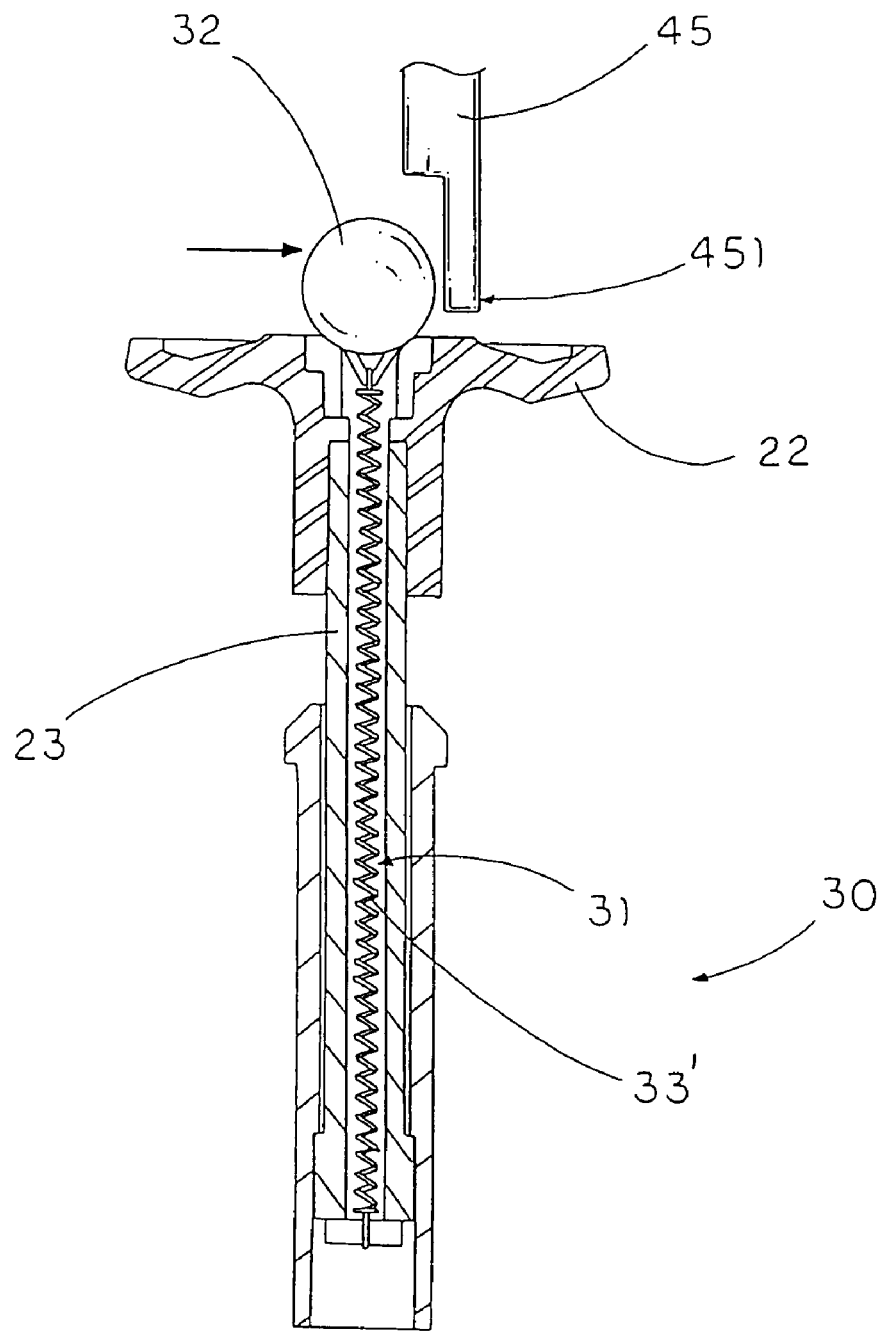

As shown in FIG. 7A, when the driving end portion 451 of the actuator 45 is driven to rotate to move the valve stopper 32 to the offset position so as to allow the water to flow through the water passage 31, the resilient element 33' is forced to stretch for applying the urging pressure against the valve stopper 32. After the driving end portion 451 of the actuator 45 moves back to its original position, the resilient element 33 rebounds to its original form to pull the valve stopper 32 back on the retaining seat 221 of the sealing platform 22 for sealing the water passage 31 so as to block the water to flow therethrough, as shown in FIG. 7B. Therefore, the resilient element 33' ensures the valve stopper 32 of the relief valve 30 returning back to the auto-operated closed position after each flushing operating.

In addition, the automatic flush actuation apparatus 2 of the present invention is capable of incorporating with most conventional flushing systems to provide the sensor operation of the flushing system with or without the flush lever 13 for starting the flushing cycle. It is worth to mention that the valve member 20 can be embodied as the valve seat 12 when the automatic flush actuation apparatus 2 of the present invention is incorporated with the conventional sensor-operation flushing system.

One skilled in the art will understand that the embodiment of the present invention as shown in the drawings and described above is exemplary only and not intended to be limiting.

It will thus be seen that the objects of the present invention have been fully and effectively accomplished. The above embodiments are shown and described for the purposes of illustrating the functional and structural principles of the present invention and is subject to change without departure from such principles. Therefore, this invention includes all modifications encompassed within the spirit and scope of the following claims.

What is claimed is:

1. A method of controlling volume of water used in each sensor-operated flushing cycle of a flushing system comprising an automatic flush actuation apparatus, comprising the steps of:
  (a) normally blocking water flowing from a water inlet to a water outlet through a flush channel of said flushing system by means of said automatic flush actuation apparatus, and moving a relief valve of said automatic flush actuation apparatus to an auto-operated closed position for blocking said water passing to said water outlet through said flush channel of said flushing system;
  (b) starting said flushing cycle of said flushing system by allowing water flowing from said water inlet to said water outlet through said flush channel of said flushing system through said automatic flush actuation apparatus, and moving said relief valve to an auto-operated opened position to start said flushing cycle for allowing said water flowing from said water inlet to said water outlet of said flushing system through said automatic flush actuation apparatus, wherein said relief valve has a water passage and a valve stopper, which is driven by an actuator to move between said auto-operated closed position and said auto-operated opened position, arranged to be able to move between said auto-operated closed position to normally close said water passage for stopping said water flowing to said water outlet and said auto-operated opened position to open said water passage for allowing said water flowing to said water outlet for controlling said water flowing from said water inlet to said water outlet, wherein said valve stopper is moved away from an opening of said water passage to open said water passage for allowing said water flowing from said water inlet to said water outlet to start said flushing cycle of said flushing system;
  (c) adjustably controlling a volume of water used in said flushing cycle for said flushing system by controlling a time of said flushing cycle, wherein said flushing cycle of said flushing system is controlled by a control processor which is adapted to control said time of said flushing cycle and said water volume for each said flushing cycle; and
  (d) stopping water passing to said water outlet by closing said flush channel until said flushing cycle is started again, and moving said relief valve from said auto-operated opened position back to said auto-operated closed position to stop said water passing to said water outlet, wherein said volume of water used in each said flushing cycle for said flushing system is controlled through said control processor to control a driven speed of said actuator so that said volume of water used in each said flushing cycle is able to be adjustably controlled by controlling said driven speed of said actuator, that is a time said actuator driving said valve stopper to stay in said auto-operated opened position, thereby said water volume of each said flushing cycle is able to be increased when said control processor delays said driving time of said actuator.

2. The method, as recited in claim 1, wherein said actuator is driven by a power generator.

3. The method, as recited in claim 2, wherein said control processor is able to be adjusted to control said time of said flushing cycle, said water volume for each said flushing cycle, a detecting range of a sensor for detecting presence of a user of said flushing system, and a motion of said power generator.

4. The method, as recited in claim 1, wherein said actuator is driven by a power generator to rotate to drive said valve stopper to move from said auto-operated closed position to said auto-operated opened position where said valve stopper is moved to offset said opening of said water passage for allowing said water passing to said water outlet.

5. The method, as recited in claim 4, wherein said volume of water used in each said flushing cycle for said flushing system is controlled through said control processor to control a rotational speed of said actuator.

6. The method, as recited in claim 5, wherein in the step (d), a movement of said valve stopper is limited by a locating ring which also guides said valve stopper returning back to said opening of said water passage after completing of said flushing cycle.

7. The method, as recited claim 5, wherein the step (a) further comprises a step of providing a urging force against said valve stopper by a resilient element disposed within said water passage to normally pull said valve stopper to close said opening of said water passage.

8. The method, as recited in claim 7, wherein, in the step (b), a driving end portion of said actuator is driven to rotate to move said valve stopper to said offset position so as to allow said water to flow through said water passage and to force said resilient element to stretch for applying a urging pressure against said valve stopper.

9. The method, as recited in claim 8, wherein the step (d) further comprises a step of pulling said valve stopper back to said auto-operated closed position to close said opening of said water passage by said resilient element while said resilient elements rebounds to an original form after said driving end portion of said actuator moves back to an original position.

10. The method, as recited in claim 9, wherein, in the step (b), said actuator is actuated to rotate in responsive to a presence of a user in front of said flushing system.

11. A method of controlling a flushing cycle of a flushing system via a valve body having a water inlet, a water outlet, and a valve member being disposed between said water inlet and said water outlet; wherein said method comprises the steps of:
  (a) providing a water passage axially extending along said valve member to communicate with said water outlet;
  (b) normally retaining a valve stopper to close said water passage by blocking an opening of said water passage for controlling said water flowing from said water inlet to said water outlet;
  (c) driving an actuator to move said valve stopper to an opened position that does not block said water passage for allowing said water passing to said water outlet, wherein said actuator is rotationally driven to move between said opened position and said closed position and said time of said valve stopper being stayed at said opened position is adjustably controlled by a rotational speed of said actuator and a rotational cycle of said actuator; and
  (d) controlling a time of said valve stopper being stayed at said opened position to control a time of said flushing cycle so as to control a volume of said water for each of said flushing cycles.

12. The method, as recited in claim 11, wherein the step (c) further comprises the steps of:
  (c.1) providing a curved contacting surface at a driving end portion of said actuator; and
  (c.2) rotationally driving said actuator to contact said curved contacting surface with said valve stopper so as to move said valve stopper at an offset position from said opening of said water passage.

13. The method, as recited in claim 12 wherein, in the step (c), said actuator is actuated to rotate in responsive to a presence of a user in front of said flushing system.

14. The method, as recited in claim 13, wherein said actuator is actuated to rotate by an electric motor.

15. An automatic actuation apparatus for a valve body having a water inlet and a water outlet, comprising:
  a valve member adapted for sealedly disposed between said water inlet and said water outlet to control water flowing from said water inlet to said water outlet;
  a powering assembly comprising a power generator, a relief valve and an actuator which is driven by said power generator to move said relief valve between an auto-operated closed position and an auto-operated opened position, at said auto-operated closed position, said relief valve blocking water passing to said water outlet, at said auto-operated opened position, said relief valve allowing said water passing to said water outlet; and
  a control processor for adjustably controlling a time of each flushing cycle of said flushing system so as to control water volume for each said flushing cycle, wherein said volume of water used in each said flushing cycle for said flushing system is controlled through said control processor to control a driven speed of said actuator so that said volume of water used in each said flushing cycle is able to be adjustably controlled by controlling said driven speed of said actuator, that is a time said actuator driving said relief valve to stay at said auto-operated opened position, thereby said water volume of each said flushing cycle is able to be increased when said control processor delays said driving time of said actuator.

16. An automatic actuation apparatus for a valve body having a water inlet and a water outlet, comprising:
  a valve member adapted for sealedly disposed between said water inlet and said water outlet to control water flowing from said water inlet to said water outlet;
  a powering assembly comprising a power generator, a relief valve and an actuator which is driven by said power generator to move said relief valve between an auto-operated closed position and an auto-operated opened position, at said auto-operated closed position, said relief valve blocking water passing to said water outlet, at said auto-operated opened position, said relief valve allowing said water passing to said water outlet; and
  a control processor for adjustably controlling a time of each flushing cycle of said flushing system so as to control water volume for each said flushing cycle, wherein said control processor is able to be adjusted to control said time of said flushing cycle, said water volume for each said flushing cycle, a detecting range of a sensor for detecting presence of a user of said flushing system, and a motion of said power generator, wherein said actuator is driven by said power generator to rotate to drive said valve stopper to move from said auto-operated closed position to said auto-operated opened position where said valve stopper is moved to offset said opening of said water passage for allowing said water passing to said water outlet.

17. An automatic actuation apparatus for a valve body having a water inlet and a water outlet, comprising:
  a valve member adapted for sealedly disposed between said water inlet and said water outlet to control water flowing from said water inlet to said water outlet;
  a powering assembly comprising a power generator, a relief valve and an actuator which is driven by said power generator to move said relief valve between an auto-operated closed position and an auto-operated opened position, at said auto-operated closed position, said relief valve blocking water passing to said water outlet, at said auto-operated opened position, said relief valve allowing said water passing to said water outlet, wherein said relief valve has a water passage and a valve stopper arranged to be able to move between said auto-operated closed position to normally close said water passage for stopping said water flowing to said water outlet and said auto-operated opened position to open said water passage for allowing said water flowing to said water outlet for controlling said water flowing from said water inlet to said water outlet; and
  a control processor for adjustably controlling a time of each flushing cycle of said flushing system so as to control water volume for each said flushing cycle, wherein said volume of water used in each said flushing cycle for said flushing system is controlled through said control processor to control a rotational speed of said actuator.

18. The automatic actuation apparatus, as recited in claim 16, wherein a movement of said valve stopper is limited by a locating ring which also guides said valve stopper returning back to said opening of said water passage after completing of said flushing cycle.

19. The automatic actuation apparatus, as recited in claim 16, wherein a resilient element is disposed within said water passage for providing a urging force against said valve stopper to normally pull said valve stopper to close said opening of said water passage, wherein a driving end portion of said actuator is driven to rotate to move said valve stopper to said offset position so as to allow said water to flow through said water passage and to force said resilient element to stretch for applying a urging pressure against said valve stopper, wherein said valve stopper is pulled back to said auto-operated closed position to close said opening of said water passage by said resilient element while said resilient elements rebounds to an original form after said driving end portion of said actuator moves back to an original position.

* * * * *